United States Patent [19]

Williamson et al.

[11] 4,391,883

[45] Jul. 5, 1983

[54] HOUSING ARRANGEMENT WITH BREAKAWAY BATTERY ACCESS DOOR

[75] Inventors: Richard D. Williamson, Fort Lauderdale; George J. Selinko, Lighthouse Point, both of Fla.

[73] Assignee: Motorola, Inc., Schaumburg, Ill.

[21] Appl. No.: 306,575

[22] Filed: Sep. 28, 1981

[51] Int. Cl.³ .............................................. H01M 2/10
[52] U.S. Cl. ...................................... 429/97; 429/100
[58] Field of Search .................................. 429/97–100

[56] References Cited

U.S. PATENT DOCUMENTS

| | | | |
|---|---|---|---|
| 4,072,800 | 2/1978 | Gammer | 429/97 |
| 4,089,044 | 5/1978 | Gatto et al. | 361/422 |
| 4,129,688 | 12/1978 | Fischer | 429/97 |
| 4,191,917 | 3/1980 | Brown et al. | 429/97 X |
| 4,204,608 | 5/1980 | Gatto | 220/335 |
| 4,230,777 | 10/1980 | Gatto | 429/97 |
| 4,269,908 | 5/1981 | Stemme | 429/99 X |
| 4,272,591 | 6/1981 | Brander | 429/100 X |

*Primary Examiner*—Anthony Skapars
*Attorney, Agent, or Firm*—Jerry A. Miller; Edward M. Roney; James W. Gillman

[57] ABSTRACT

An improved housing arrangement is disclosed for a small, hand-held battery powered portable device which includes an associated battery compartment with integral battery door accessible from the side of the housing. The battery door and compartment are intercoupled by a non-destructive, breakaway hinge device which permits separation therebetween when the door is pivoted outwardly from the top beyond a set predetermined limit. It may be reattached simply and conveniently by a press fit. A latch mechanism is included integral with the surface of the battery door which may be operated by hand without special tools to latch and unlatch the door.

4 Claims, 7 Drawing Figures

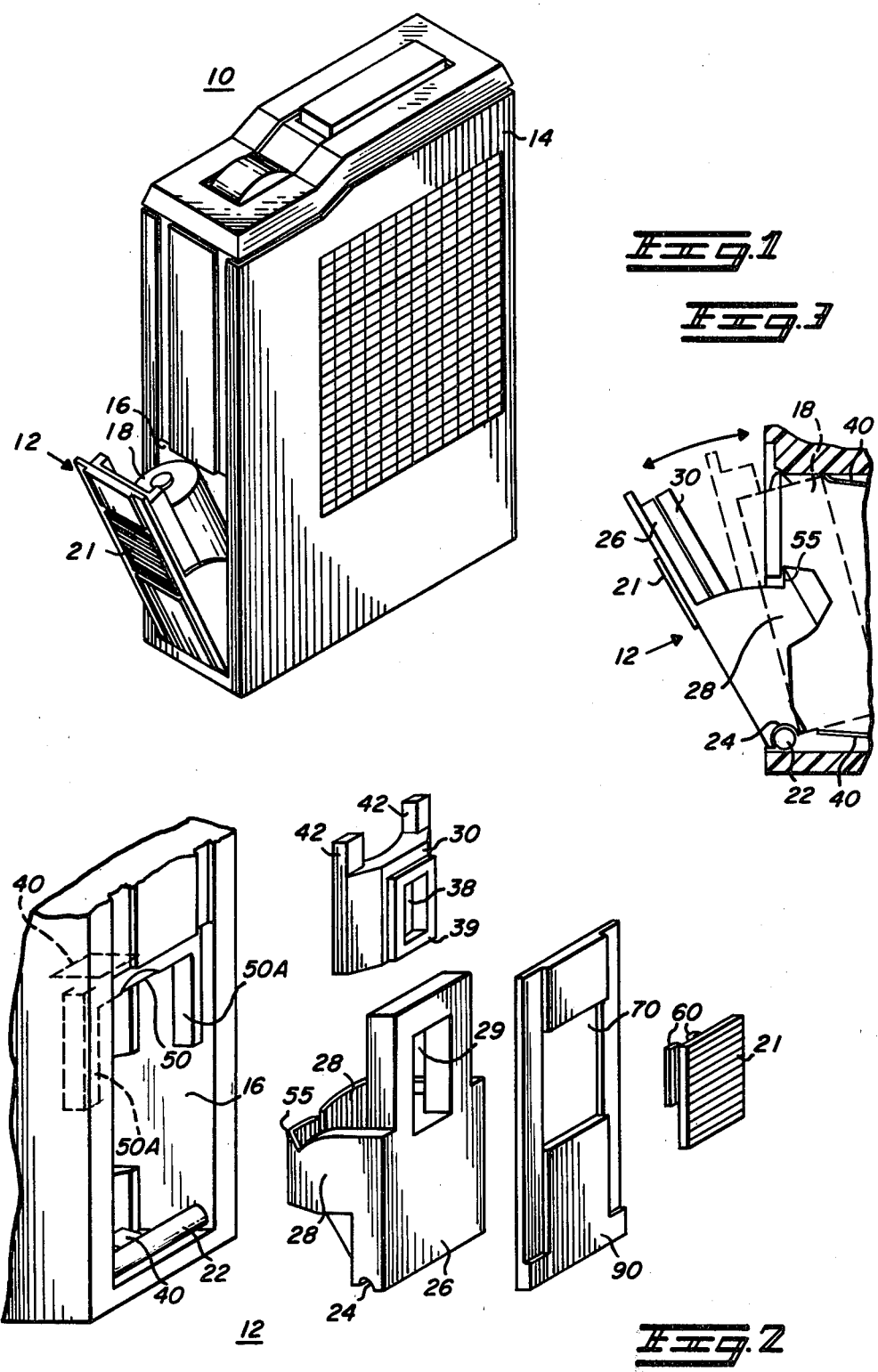

HOUSING ARRANGEMENT WITH BREAKAWAY BATTERY ACCESS DOOR

BACKGROUND OF THE INVENTION

The present invention relates in general to small housing assemblies for personal electronic devices and in particular to an improved housing assembly for receiving associated electrical components and having a non-destructive, breakaway door panel for accessing a battery used for the source of power.

In small portable radio apparatus or the like, a battery is customarily utilized for powering the device. From time to time it becomes necessary to access the battery at least for purposes of replacement. Housing assemblies, utilizing molded plastic component parts, for small portable electronic apparatus, are of course known in the art. Such assemblies have usually required somewhat elaborate interfitting with one another and are maintained in an assembled relationship by one means or another, such as by screws engaging inserts provided in the molded housing or by other fasteners. This has the objection that inserts molded into the plastic housing to receive the screws will involve a substantial cost. Captive machine screws may be used to prevent the loss of the screws, but are relatively expensive. Similarly, in most instances, special tools of some sort may be required when assembling the housing assembly.

When it is intended only to replace a low-drain battery, it is preferrable that access to the interior of the radio apparatus, vis a vis the battery chamber, be made difficult so as to prevent undesired tampering with the internal chassis and the delicate electrical components contained thereon. In other words, it should be made possible to effectuate a battery replacement by the user without access to the housing proper.

Some housing arrangements include horizontal or vertical sliding panels that slide completely off the housing and for that reason are subject to loss and damage if dropped and stepped on. Often these slidable covers are latched by a separate mechanism completely divorced from the battery cover itself and additionally must be operated with a special tool or coin.

Still other battery panels or doors are designed to pivot about one end to provide access to the battery. The problem here is that oftentimes it pivots in a manner which permits the battery to fall out when the battery door is opened. In addition, such pivoting battery doors may easily be damaged by being forced beyond a set predetermined limit. The doors either break off or are bent out of proper alignment.

Oftentimes, when attempting to access the battery compartment in all of these referenced prior arrangements, the user may exert sufficient force on the battery housing panel to damage the panel in such a manner as to result in a less secure fastening of the panel member to the battery compartment inner housing after the battery has been replaced. Then too, many of these prior art devices have access to the internal battery compartments in such a manner as to require the user to, after removing the external battery compartment panel, turn the unit in an upside down or sideways fashion to remove the battery from its compartment. Oftentimes the battery will fall out during such movement at a time when the user is not ready to effect the replacement. Additionally, as the radio unit is turned from side-to-side a high degree of risk results in that it may drop from the user's hands.

SUMMARY OF THE INVENTION

Accordingly, it is an object of the present invention to provide an improved housing arrangement with an integral battery access door which overcomes the foregoing referenced deficiencies.

A more particular object of the present invention is to provide an improved housing arrangement with a battery door accessible from the side which provides non-destructive, breakaway action when pivoted beyond a set predetermined distance.

Another object of the present invention is to provide an improved housing arrangement with a side accessed battery door of the foregoing type wherein a battery holder is utilized to captivate an associated battery cell within the battery door member and which moves the battery in and out of electrical contact with power terminals by the action of opening and closing the battery door itself.

Yet another object of the presnt invention is to provide an improved housing arrangement with a side accessed battery door of the foregoing type, which battery door includes a battery latch mechanism integral with its surface that may be actuated without special tools.

In practicing the invention, an improved housing arrangement for housing electrical components of a receiver or the like is provided which includes a non-destructive, breakaway battery door interfacing with an associated battery compartment for accommodating a battery device. The compartment or cavity is preferably located along the side of the housing for convenient access. A hinge arrangement having respective portions is utilized to intercouple the battery door to the battery compartment. If the hinge is pivoted beyond a certain set predetermined limit, the battery door simply non-destructively separates from the housing proper. It may be attached simply and conveniently by a press fit. The battery door further includes a latching mechansim integral with its surface. It may be operated by hand in a lateral direction to latch and unlatch the battery door without special tools or the like.

BRIEF DESCRIPTION OF THE DRAWINGS

The features of the present invention which are believed to be novel are set forth with particularity in the appended claims. The invention itself, together with further objects and advantages thereof, may be understood by reference to the accompanying drawings, in which:

FIG. 1 is a perspective view of an electronic device having a housing arrangement in accordance with the invention with the hinged battery compartment door in an open position;

FIG. 2 is an enlarged fragmentary exploded view of the battery compartment door member and associated battery cavity with breakaway hinges for intercoupling the same; and FIG. 3 is an enlarged fragmentary view in cross-section of the battery compartment and battery door showing the position of the door and associated battery in different operative locations.

DETAILED DESCRIPTION OF THE PREFERRED EMBODIMENT

Referring now to the drawings, FIG. 1 represents a perspective view of an improved housing assembly 10 in accordance with the present invention having a non-destructable, breakaway battery door assembly 12. The housing assembly 10 includes a one piece housing 14, molded from a suitable thermal plastic resin material or the like. As illustrated, housing 14 includes front, back, bottom and sidewalls but an open top. An internal predetermined battery cavity 16 is provided at the side of housing 14, into which a battery cell 18 may be securely captivated by the battery door 12 subassembly as will be explained subsequently. The battery door 12 has an integral sliding latch means 20 which in a latched position secures the battery door 12 to the side of the housing 14. Housing 14 is adapted to receive an associated electrical chassis assembly into the interior thereof, the identity and description of the operational characteristics are deemed not to be necessary, since they form no specific part of the present invention as such.

In FIG. 2 the entire view of the non-destructible breakaway battery door subassembly 12 is shown in an enlarged partial and exploded view for clarity. As shown, the integral members interlock in such a fashion that the integral male member part 21 of latch mechanism 20 includes end members 60 which are designated to protrude through cavity opening 70 to interlock with female receptical member 30 by making a snap fit within aperture 38 thereof. Member 60 is of a predetermined length and width to exactly align itself in a secure fashion with aperture opening 38. As will be noted, aperture 38 is surrounded by a forward shoulder portion 39 which is slidably retained within an associated opening 29 in a battery holder 26. That is, shoulder 39 is somewhat less in length than the opening 29 so that it may move up and down therein. For the same reason, opening 70 is made somewhat longer in length than the latch male member 21.

As already mentioned, battery door assembly 12 includes internal battery holder 26. Holder 26 includes two integral horizontal wing members 28, protruding in cylindrical fashion to captivate the surface of the intended cylindrical battery cell 18 as illustrated in FIGS. 1 and 2.

As will be appreciated, battery holder 26, by physically captivating battery 18, automatically positions the same within cavity 16 when door panel of assembly 12 is closed and withdraws it for easy accessibility when door assembly 12 is opened, such as shown in FIG. 1. When battery 18 is positioned within cavity 16, respective ends thereof are placed in electrical contact with terminals 40 (see FIGS. 2 and 3) which supply power to the electrical circuitry (not shown) of the device 10.

As mentioned previously, battery door assembly includes a latch mechanism 20. When the sliding member 21 is positioned upwardly, the forward extensions 42 on internal member 30 move to a location in back of ledge or shoulder 50 to thereby latch the door panel firmly in place. Pushing downwardly on sliding member 21 unlatches assembly 12 so that the door panel may be pivoted outwardly at the top as indicated.

FIG. 3 further depicts the operative engagement of the battery 18 when door assembly 12 is closed. As shown in dotted line, battery 18, which is slightly longer in length than the distance between resilient terminals 40 is forced into an upright position between the terminals 40. The resiliency of the terminals force them into operative engagement with respective ends of battery 18. Conversely, when door assembly 12 is pivoted outwardly, battery holder 26 forces battery 18 to likewise pivot and presents the top end of battery 18 in the position shown in FIG. 1 for easy grasping and removal.

The breakaway hinge structure for battery door assembly 12 is illustrated in FIGS. 2 and 3. The structure includes a cylindrical end member 22 extending across the bottom of battery cavity 16. The door panel includes a C-shaped recessed 24 dimensioned to overfit the end member 22 and form a pivot point about which the door panel rotates. As will be noted, a door stop is provided by extensions 55 on the forward end of battery holder 26. In the open set position of the door panel, door stops 55 abut the inner surface of the downwardly extending legs 50a of shoulder 50 (see FIG. 2). This is the position as depicted in FIG. 1. Exerting pressure on the door assembly 12 in the position above a certain level causes door stops 55 to slide under legs 50a and the door panel to separate away from the housing 14 entirely. The door may quickly and conveniently be restored to operating engagement by positioning recess 24 over rod 22 and pushing inward on the door so that door stops 55 again are forced under legs 50a to a position which is on the interior side of legs 50a.

Accordingly, what is claimed is:

1. An improved housing arrangement for housing electrical components and having a non-destructive, breakaway battery door, comprising in combination:
    a housing having top, bottom, front, back and side walls, said housing including a cavity for accomodating an associated cylindrical battery with an opening along one side of said housing giving access to said battery cavity;
    a battery door panel interfitting in said battery cavity opening;
    breakaway hinge means with respective portions intercoupling the bottom of said door panel and said housing to permit said door to pivot outwardly at the top thereof, said door when pivoted outwardly beyond a predetermined distance forcing disengagement of respective portions of said hinge means to non-destructively separate said door from said housing;
    shoulder means mounted on said housing inside said battery cavity;
    a cylindrical wing member integral to the interior side of said battery door panel into which a cylindrical battery is placed, said wing member including a door stop means which engages said shoulder means when said door panel is extended outwardly to a predetermined distance; and
    latch means, integral with said battery door surface and operable in a lateral direction to releasably latch said battery door in said housing.

2. An improved housing arrangement in accordance with claim 1, wherein said breakaway hinge means includes a first cylindrical rod portion extending across the bottom of said cavity which is overfitted by a circular recess extending across the bottom edge of said door panel, said bottom door edge pivoting about said rod within set predetermined limits.

3. An improved housing arrangement in accordance with claim 1, wherein said battery door panel includes a battery holder for accepting and captivating an associated battery and wherein the pivoting of said battery door panel brings the battery into and out of said electrical contact within said battery cavity.

4. An improved housing arrangement in accordance with claim 1, wherein said battery door panel contains a vertically slidable latch means integral thereto which operates to secure the battery door panel to said housing by the associated movement of internal vertical projecting members which position themselves at a predetermined distance against the top shoulder of the inner battery cavity contained within the housing arrangement, in such a manner to thereby secure the battery door panel when in a latched position.

* * * * *